(12) United States Patent
Li et al.

(10) Patent No.: US 7,894,793 B2
(45) Date of Patent: *Feb. 22, 2011

(54) PORTABLE ELECTRONIC DEVICE WITH FASTENING MECHANISM

(75) Inventors: You-Zhi Li, Guangdong (CN); Xi-Ping Dai, Guangdong (CN)

(73) Assignees: Honf Fu Jin Precision Industry (Shen Zhen) Co., Ltd., Longhua Town, Bao'on District, Shenzhen, Guangdong Province; Hon HAi Precision Industry Co., Ltd., Tu-Cheng, Taipei Hsien (TW)

( * ) Notice: Subject to any disclaimer, the term of this patent is extended or adjusted under 35 U.S.C. 154(b) by 1438 days.

This patent is subject to a terminal disclaimer.

(21) Appl. No.: 11/306,968

(22) Filed: Jan. 17, 2006

(65) Prior Publication Data
US 2006/0262495 A1 Nov. 23, 2006

(30) Foreign Application Priority Data
May 20, 2005 (CN) .................... 2005 2 0058737 U

(51) Int. Cl.
*H04B 1/38* (2006.01)
(52) U.S. Cl. ...................... 455/347; 455/351
(58) Field of Classification Search ........................ None
See application file for complete search history.

(56) References Cited

U.S. PATENT DOCUMENTS

| 5,251,329 | A | * | 10/1993 | Takagi et al. | ................. 455/572 |
| 5,535,437 | A | * | 7/1996 | Karl et al. | ................. 455/575.1 |
| 5,752,205 | A | * | 5/1998 | Dzung et al. | ............. 455/575.1 |
| 6,495,987 | B2 | * | 12/2002 | Kuo et al. | .................... 320/107 |
| 6,808,842 | B2 | | 10/2004 | Siddiqui et al. | |
| 7,431,609 | B2 | * | 10/2008 | Wang et al. | ................. 439/500 |

FOREIGN PATENT DOCUMENTS

CN 2574178 Y 9/2003

* cited by examiner

*Primary Examiner*—Thanh C Le
(74) *Attorney, Agent, or Firm*—Winston Hsu; Scott Margo

(57) ABSTRACT

A portable electronic device includes a main body and a subsidiary casing. The main body includes a first side wall and a bottom wall. The first side wall defines at least one receptacle and at least one hole therein. The receptacle includes a cavity and a slot. The cavity spans from the bottom wall up into the main body. The slot is defined vertically in a part of the first side wall. The slot intercommunicates between the cavity and an exterior of the first side wall. The subsidiary casing includes a base and a cover. At least one latch and at least one connector are formed on the base. The latch is configured for being received in the receptacle and the connector is configured for being received in the hole.

19 Claims, 7 Drawing Sheets

PORTABLE ELECTRONIC DEVICE WITH FASTENING MECHANISM

FIELD OF THE INVENTION

The present invention generally relates to a portable electronic device with a fastening mechanism. The portable electronic device includes a main body and a subsidiary casing. The fastening mechanism is for connecting the main body and the subsidiary casing.

DESCRIPTION OF RELATED ART

In recent years, electronic apparatus such as portable DVD players, Notebook computers, and PDAs (Personal Digital Assistants) have been widely used due to their portability and convenience. In order to work anywhere and anytime, the portable electronic apparatus usually needs batteries. However, conventional batteries are usually unsuitable because they are not small enough to be received in the portable electronic apparatus, and portable electronic apparatuses are getting smaller and smaller.

Therefore, a portable electronic device with an exterior power supply has been proposed. The portable electronic device includes a main body and a subsidiary casing containing batteries for supplying power to the main body. Screws and nuts are used to connect the main body and the subsidiary casing. However, it is not convenient for users to attach the subsidiary casing to the main body.

Accordingly, as shown in FIGS. 6 and 7, an improved fastening mechanism for an optical disc player is proposed. The optical disc player 100 includes a main body 110 and a subsidiary casing 120 removably attached to the main body 110. The main body 110 has a right-side wall 119 with a receptacle 111 horizontally extended therein. Two pairs of blocks 113, 114, and 115, 116 vertically extend from the right-side wall 119 covering portions of the receptacle 111. A locking hole 112 is also defined in the right-side wall 119 and communicates with the receptacle 111, so as to lock the subsidiary casing 120 onto the main body 110.

The subsidiary casing 120 has a first lateral surface 129, which mates with the right-side wall 119 of the main body 110 when the subsidiary casing 120 is attached to the main body 110. The first lateral surface 129 has a hole 123. An L-shaped latch 121 perpendicularly extends from the first lateral surface 129, and is configured for being received in the receptacle 111 of the main body 110. A connector 122 is movably installed in the subsidiary casing 120. The connector 122 has a protrusion 124 at a distal end thereof. The protrusion 124 protrudes out of the subsidiary casing 120 from the hole 123 and is received into the locking hole 112 of the main body 110 for locking the subsidiary casing 120 onto the main body 110, and can be drawn back into the subsidiary casing 120 for releasing the subsidiary casing 120 from the main body 110.

When the subsidiary casing 120 is attached to the main body 110, the latch 121 of the subsidiary casing 120 is inserted into the receptacle 111 and slid into position to be received and blocked by the blocks 113, 114, 115, 116. The protrusion 124 is inserted into the locking hole 112 for preventing the latch 121 from sliding along the receptacle 111. Therefore, the subsidiary casing 120 is fastened onto the main body 110.

However, it is not an obvious operation that the latch 121 of the subsidiary casing 120 should be inserted into the receptacle 111. Users often have difficulty in inserting the latch 121 into the receptacle 111. Therefore, the improved fastening mechanism is still complex and inconvenient to users.

Therefore, a portable electronic device with a simple fastening mechanism is needed in the industry to address the aforementioned deficiencies and inadequacies.

SUMMARY OF INVENTION

Briefly described, one embodiment of a portable electronic device with a fastening mechanism, among others, can be implemented as described herein.

A portable electronic device includes a main body and a subsidiary casing. The main body includes a first side wall and a bottom wall. The first side wall defines at least one receptacle and at least one hole therein. The receptacle includes a cavity and a slot. The cavity spans from the bottom wall up into the main body. The slot is defined vertically in a part of the first side wall. The slot intercommunicates between the cavity and an exterior of the first side wall. The subsidiary casing includes a base and a cover. At least one latch and at least one connector are formed on the base. The latch is configured for being received in the receptacle and the connector is configured for being received in the hole.

Other systems, methods, features, and advantages of the present fastening mechanism will be or become apparent to one with skill in the art upon examination of the following drawings and detailed description. It is intended that all such additional systems, methods, features, and advantages be included within this description, be within the scope of the present device, and be protected by the accompanying claims.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION

Reference will now be made to the drawings to describe a preferred embodiment of the present invention.

Figure 1:
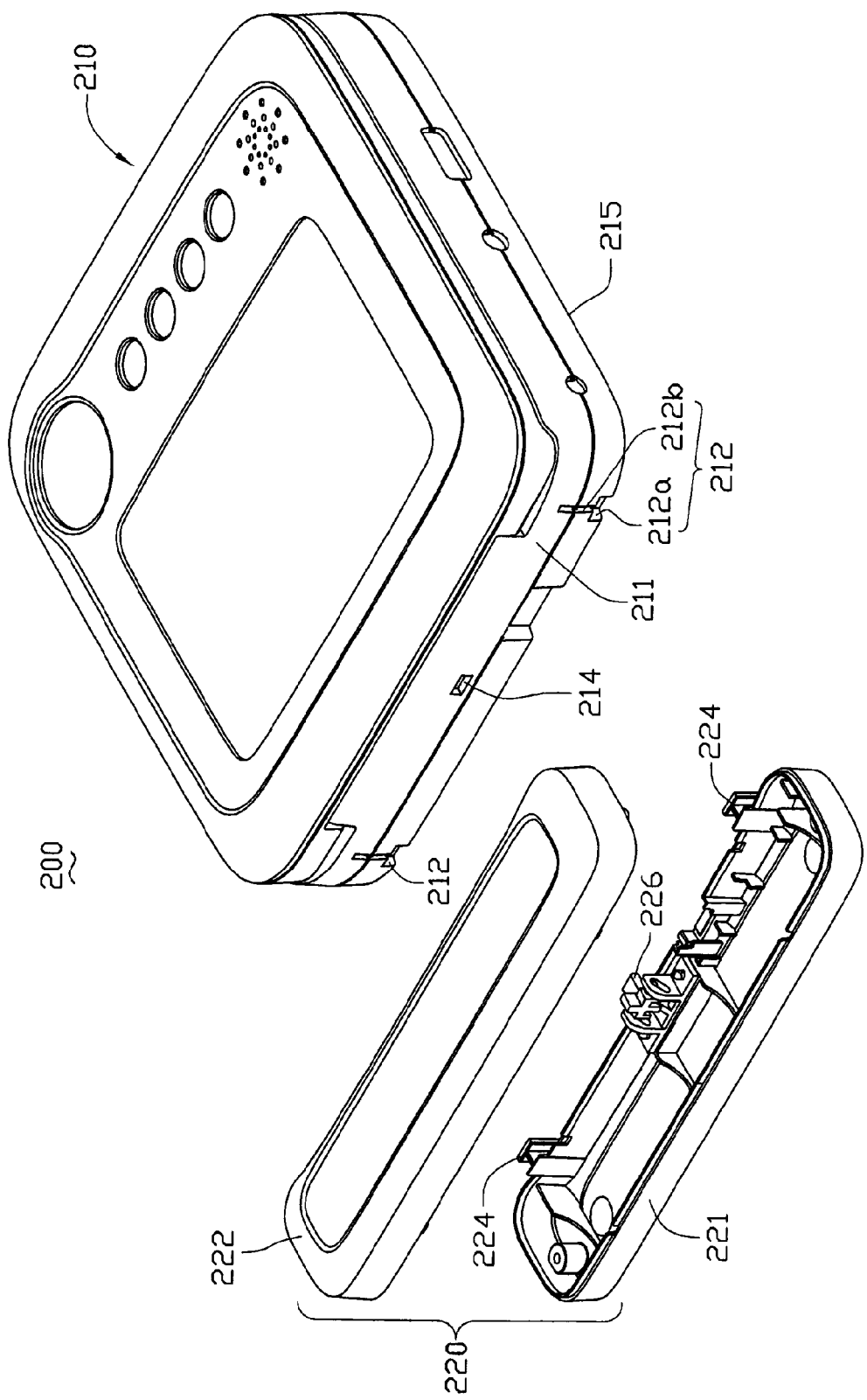
FIG. 1 is a partially exploded, isometric view of a portable disc player in accordance with an exemplary embodiment of the present invention, the portable disc player including a main body and a subsidiary casing.

Referring to FIG. 1, a portable disc player 200 includes a main body 210 and a subsidiary casing 220. The main body 210 is used for reading an optical disc (not shown) and displaying information read from the optical disc. The subsidiary casing 220 removably attached to the main body 210 is used for receiving batteries (not shown) therein, so as to supply power to the main body.

Figure 2:
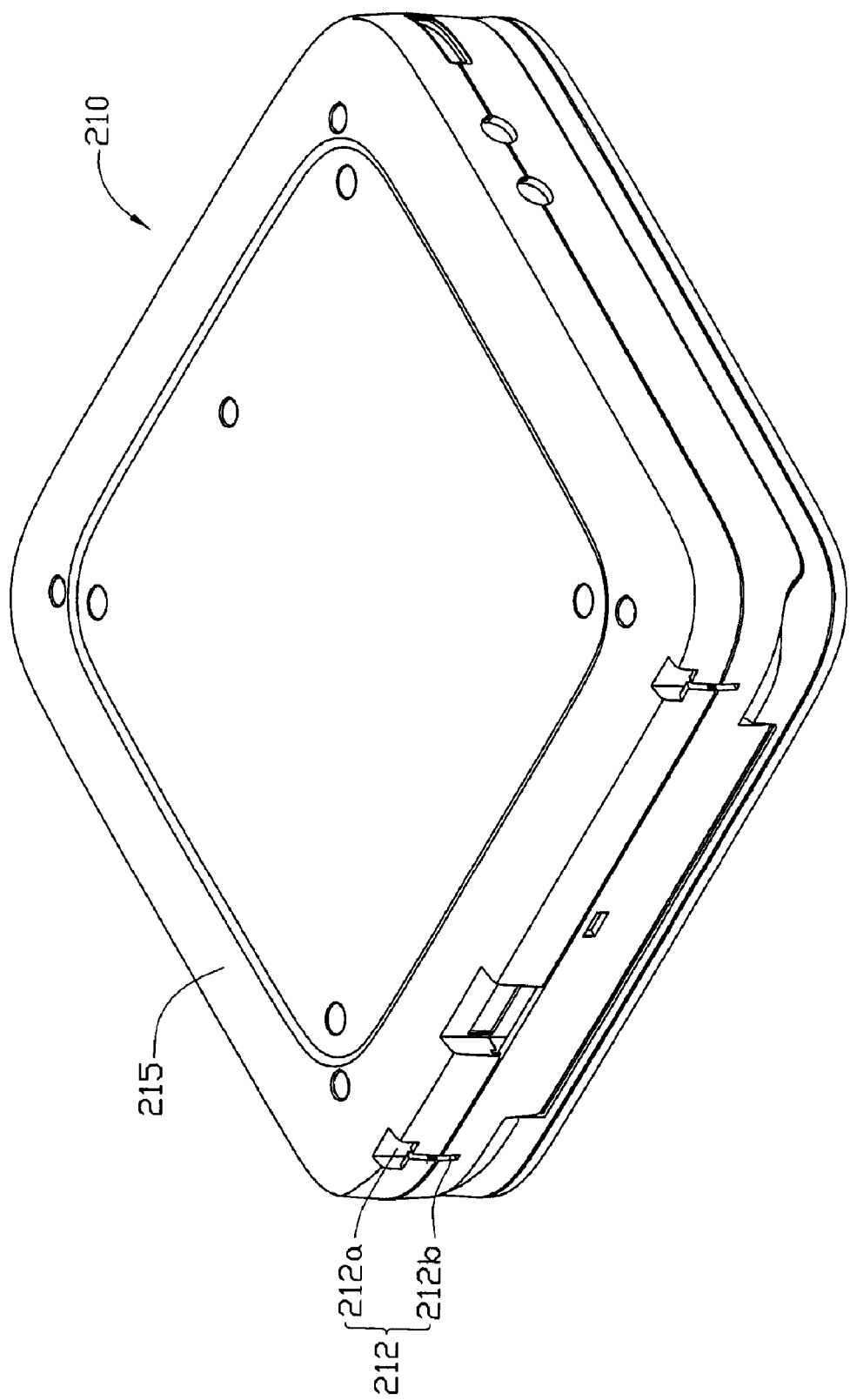
FIG. 2 is an enlarged view of the main body of FIG. 1, but viewed from another aspect.

The main body 210 has a first side wall 211 facing the subsidiary casing 220. Two receptacles 212 are defined in the first side wall 211 and extend upwardly from the lower border of the first side wall 211. A hole 214 is defined in a middle portion of the first side wall 211. As shown in FIG. 2, each receptacle 212 has a cavity 212a and a slot 212b communicating with the cavity 212a. The cavity 212a spans from a bottom wall 215 of the main body 210 where the bottom wall 215 adjoins the first side wall 211 up into the main body 210. A vertical slot 212b is defined in a part of the first side wall 211 that bounds the cavity 212a. The slot 212b intercommunicates between the cavity 212a and an exterior of the first side wall 211.

Figure 3:
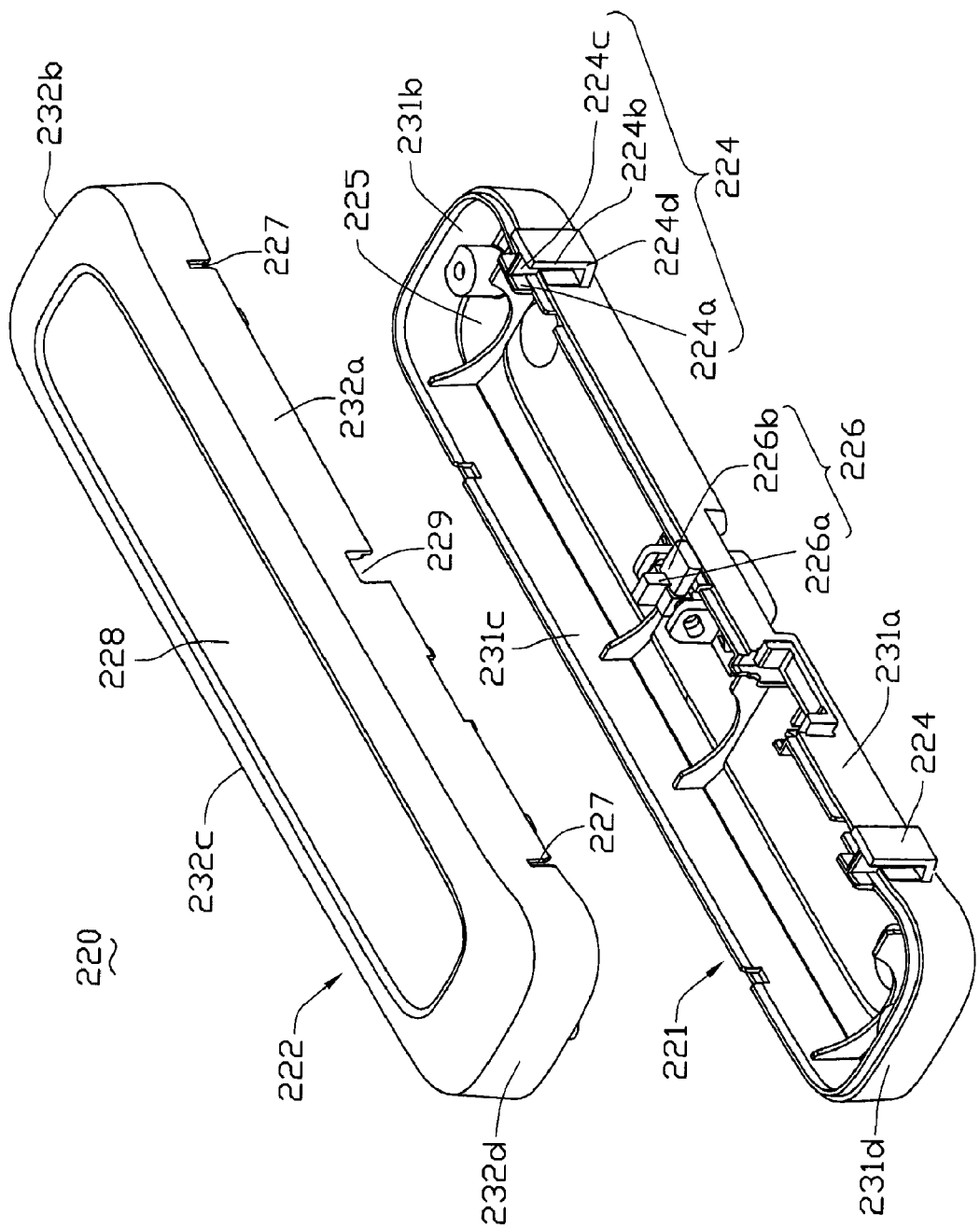
FIG. 3 is an enlarged view of the subsidiary casing of FIG. 1, but viewed from another aspect.

Referring also to FIG. 3, the subsidiary casing 220 includes a base 221 and a cover 222. The base 221 and the cover 222 are hollow cubical containers. The base 221 and the cover 222 cooperatively define a containing space (not shown) for receiving batteries (not shown) therein.

The base 221 includes a bottom 225 and four second side walls 231a, 231b, 231c, 231d respectively extending upwardly from four edges of the bottom 225. The four second side walls 231a, 231b, 231c, 231d interconnect in sequence with each other and surround the bottom 225. Two latches 224 are formed on the second side wall 231a. Each latch 224 includes an inboard part 224a, an outboard part 224b, a middle part 224c, and a connective part 224d. The inboard part 224a and the outboard part 224b are substantially parallel to the second side wall 231a. The middle part 224c extends perpendicularly out from the second side wall 231a to a middle of the outboard part 224b. The connective part 224d connects a bottom of the outboard part 224b and the second side wall 231a. The latch 224 is strengthened with the conjunction of the inboard part 224a and the middle part 224c. The inboard part 224a prevents the latch 224 from bending towards an exterior of the second side wall 231a. A connector 226 is formed within the base 221 and along an edge of the second side wall 231a. The connector 226 includes a backseat 226a and an inserting block 226b. The backseat 226a is behind the inserting block 226b and connects to it. The inserting block 226b can move toward or away from the main body 210, for inserting into or retreating from the hole 214 of the main body 210.

Similar to the base 221, the cover 222 includes a top 228 and four third side walls 232a, 232b, 232c, 232d respectively extending downwardly from the four edges of the top 228. The four third side walls 232a, 232b, 232c, 232d interconnect in sequence with each other and surround the top 228. Two first notches 227 corresponding to the two latches 224 are defined in two opposite ends of the third side wall 232a, and a second notch 229 corresponding to the connector 226 is defined in a middle of the third side wall 232a.

Figure 4:
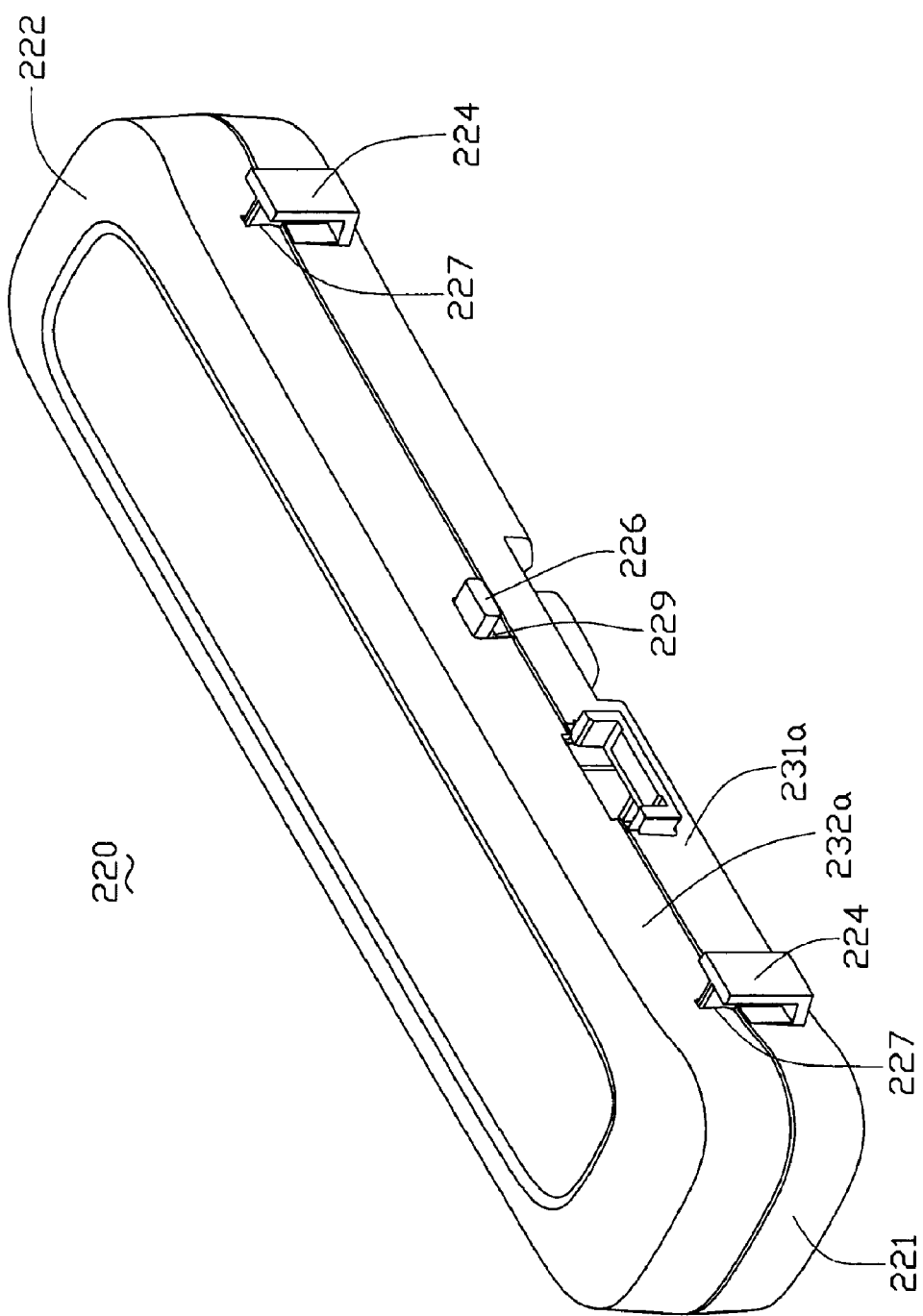
FIG. 4 is an assembled, isometric view of the subsidiary casing of FIG. 1.

Referring to FIG. 4, in assembly of the subsidiary casing 220, first, the base 221 receives batteries (not shown). Then, the middle parts 224c of the latches 224 are received into the first notches 227, and the inserting block 226b of the connector 226 is received into the second notch 229. The engagement of the middle parts 224c and the first notches 227 ensure precise mounting of the cover 222 onto the base 221. After assembly, the inboard part 224a is adjacent to the inboard surface (not shown) of the third side wall 232a, and prevents the cover 222 from sliding away from the base 221 along a direction that is parallel to the bottom 225. Therefore, the cover 222 is firmly engaged with the base 221.

Figure 5:
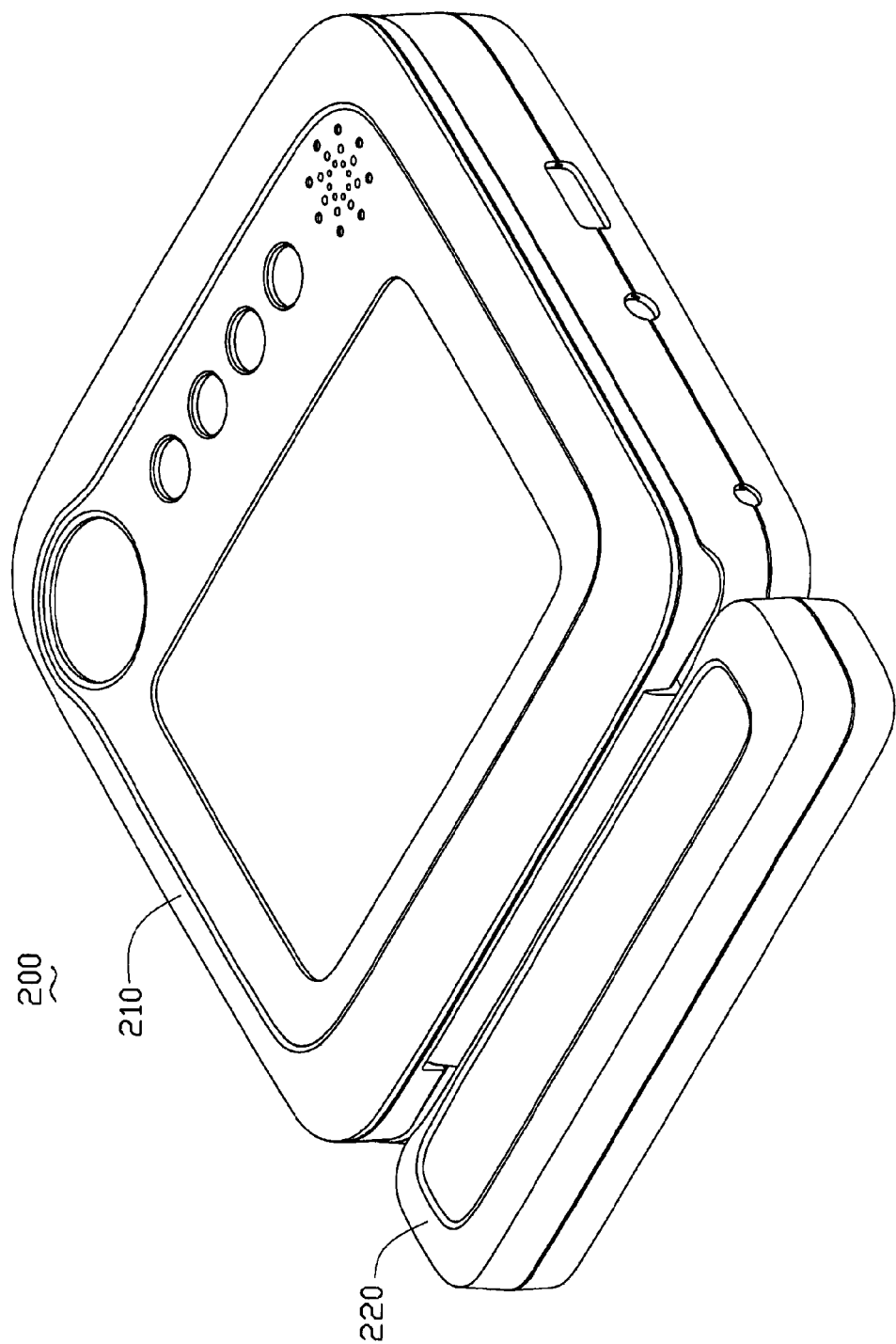
FIG. 5 is an assembled, isometric view of the portable disc player of FIG. 1.
Figure 6:
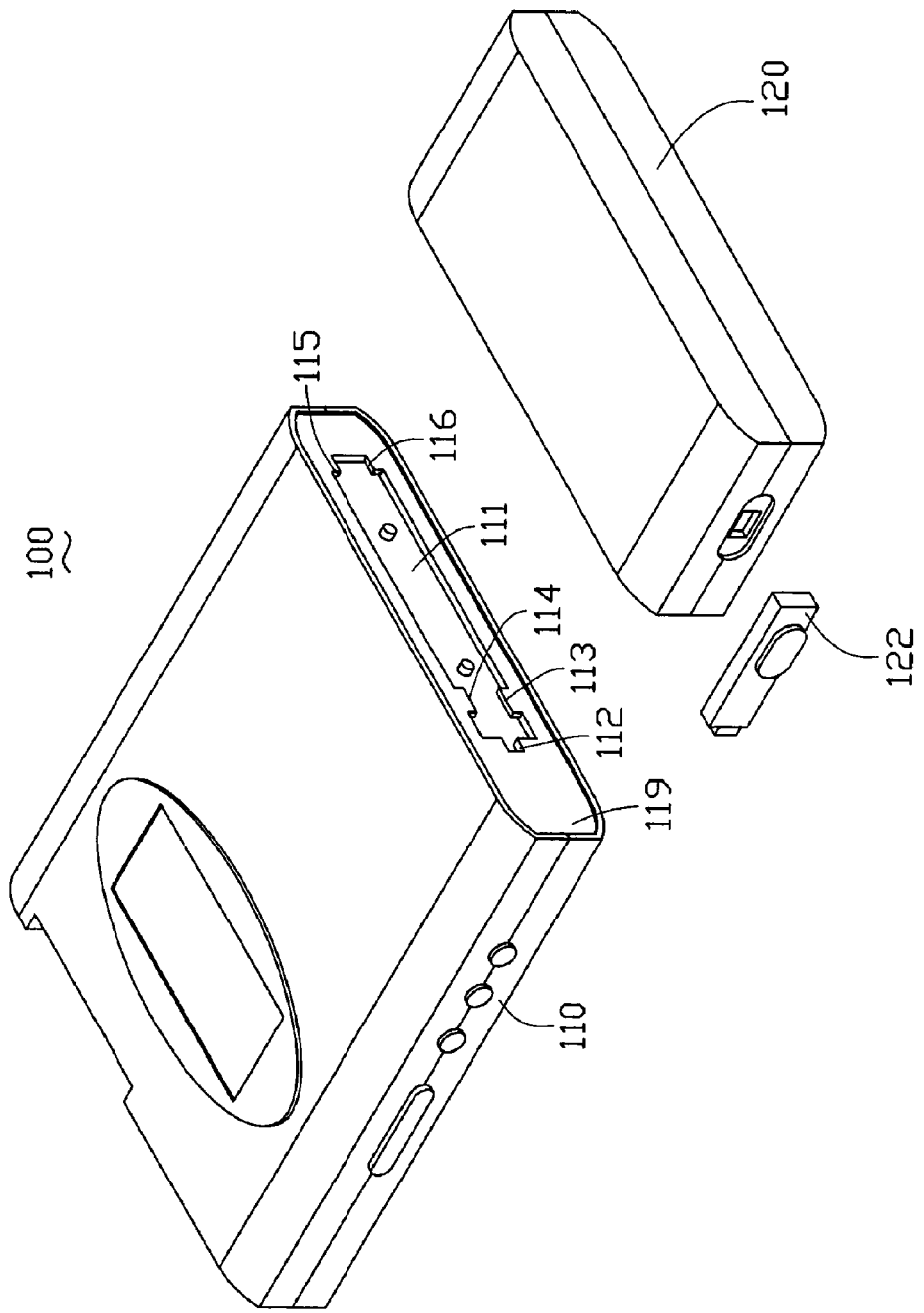
FIG. 6 is an exploded, isometric view of a conventional portable disc player.
Figure 7:
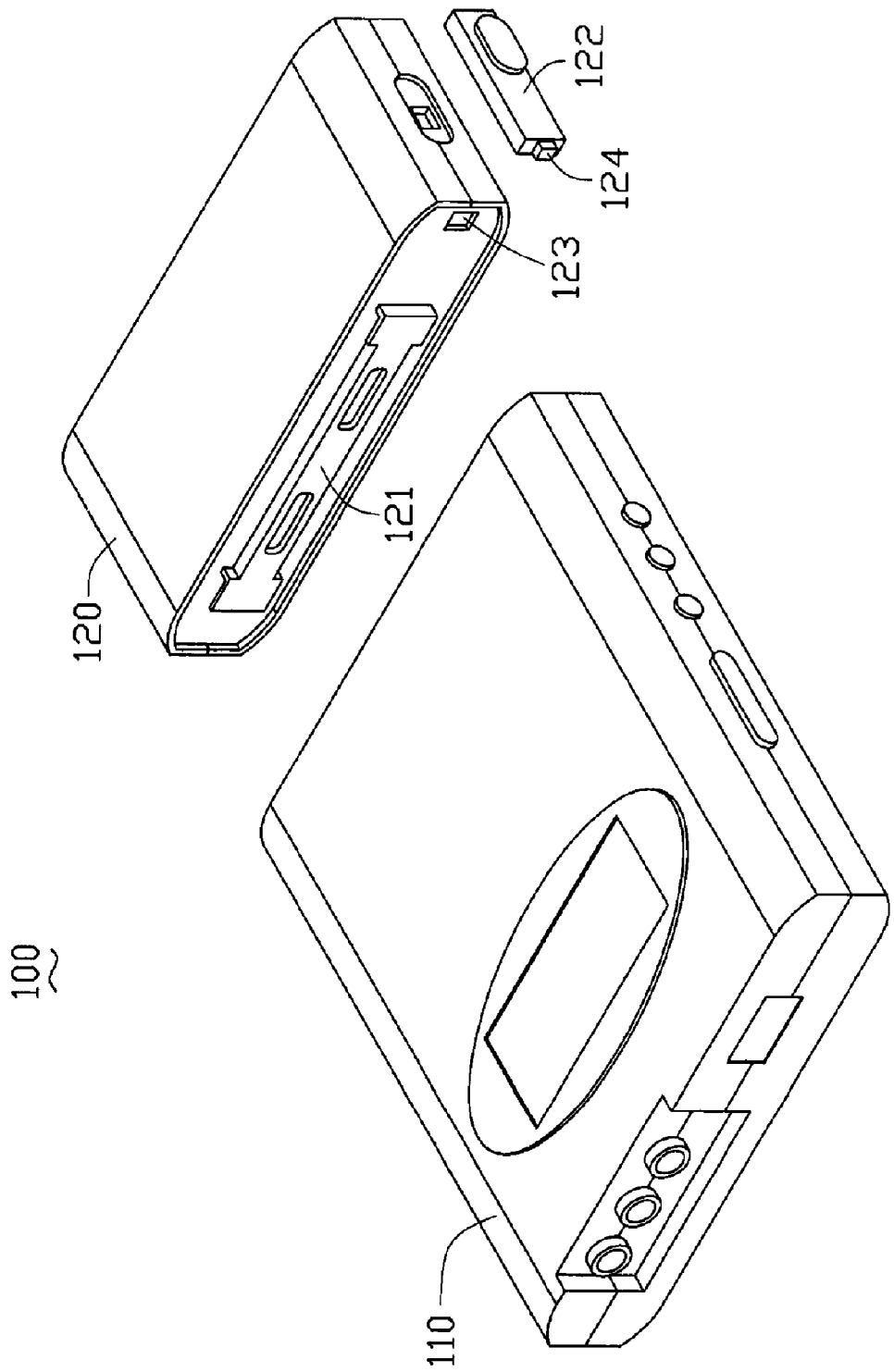
FIG. 7 is similar to FIG. 6, but viewed from another aspect.

When the subsidiary casing 220 is attached to the main body 210, the latches 224 of the subsidiary casing 220 are slid into the corresponding receptacles 212 of the main body 210, and the connector 226 is inserted into the hole 214 as the latches 224 reach the end of the receptacles 212. The latches 224 engaged in the receptacles 212 prevent the subsidiary casing 220 from moving along a first direction perpendicular to the first side wall 211. The connector engaged into the hole 214 prevents the subsidiary casing 220 from moving along a second direction that is perpendicular to the first direction. Thus, as shown in FIG. 5, the subsidiary casing 220 is fixed firmly to the main body 210. When detaching the subsidiary casing 220 from the main body 210, the connector 226 retreats from the hole 214. The latches 224 slide out from the receptacles 212. Then, the subsidiary casing 220 is easily removed from the main body 210. Additionally, the inboard parts 224a cooperate with the cover 222 to ensure tight engagement of the subsidiary casing 220 with the main body 210. In operation, sliding the latches 224 into the receptacle 212 is a transparent and simple task, so the portable disc player 200 is convenient for users to assemble and disassemble.

It should be emphasized that the above-described preferred embodiment, is merely a possible example of implementation of the principles of the invention, and is merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and be protected by the following claims.

What is claimed is:

1. A portable electronic device comprising:
    a main body comprising a first side wall and a bottom wall, the first side wall defining at least one receptacle and at least one hole therein, the at least one receptacle comprising a cavity and a slot, the cavity spanning from the bottom wall up into the main body and the slot being defined upwardly in a part of the first side wall, the slot intercommunicating between the cavity and an exterior of the first side wall; and
    a subsidiary casing comprising a base and a cover, at least one latch and at least one connector being formed on the base, the at least one latch being configured for being received in the at least one receptacle, the at least one connector being configured for being received in the at least one hole, the at least one latch comprising an inboard part extending from the base towards the cover for strengthening the at least one latch.

2. The portable electronic device according to claim 1, wherein the base includes a plurality of second side walls, the at least one latch is formed on one of the second side walls, and the cover includes a plurality of third side walls.

3. The portable electronic device according to claim 2, wherein one of the at least one latch extends from the one second side wall to one of the third side walls and a part of the one latch is above the one second side wall.

4. The portable electronic device according to claim 3, wherein the inboard part extends from the one second side wall towards the one third side wall.

5. The portable electronic device according to claim 3, wherein the at least one connector is formed within the base and along an edge of the one second side wall.

6. The portable electronic device according to claim 1, wherein the one latch comprises an outboard part parallel to the inboard part, and the outboard part is insertable into the cavity of the main body.

7. The portable electronic device according to claim 6, wherein the one latch comprises a middle part extending from the inboard part to the outboard part, and the middle part is configured for being received in the slot.

8. The portable electronic device according to claim 7, wherein the one latch comprises a connective part connecting a bottom end of the outboard part and the one second side wall.

9. The portable electronic device according to claim 8, wherein at least one first notch is defined in one of the third side walls, and one of said at least one first notch is configured for receiving said middle part of the one latch.

10. The portable electronic device according to claim 9, wherein at least one second notch is defined in the one third side wall, and one of said at least one second notch is configured for receiving said at least one connector.

11. A portable electronic device comprising:
  a main body comprising a side wall defining a receptacle and a hole therein; and
  a subsidiary casing defining a space therein, comprising a latch and a connector formed thereon,
  the connector being received in the hole, the latch comprising a first portion located outside the space and engaged in the receptacle, and a second portion located in the space and connected with the first portion to enhance a mechanical strength of the first portion, the first portion comprising an outboard part engaged in the receptacle, and a middle part connecting the outboard part with the second portion.

12. The portable electronic device according to claim 11, wherein the main body comprises a bottom wall, said side wall extending from the bottom wall, and the receptacle extends along a direction perpendicular to a plane defined by the bottom wall.

13. The portable electronic device according to claim 11, wherein the subsidiary casing comprises a base and a cover coupled together to cooperatively define the space, the latch extends from one of the base and the cover to the other of the base and the cover.

14. The portable electronic device according to claim 13, wherein the one of the base and the cover comprises another side wall facing said side wall of the main body, and the latch is formed on said another side wall.

15. The portable electronic device according to claim 14, wherein the outboard part parallel to said another side wall, and the middle part connecting a middle of the outboard part to said another side wall.

16. The portable electronic device according to claim 15, wherein the second portion of the latch comprises an inboard part extending from said another side wall and connected to the middle part.

17. The portable electronic device according to claim 15, wherein the first portion comprises a connective part connecting an end of the outboard part to said another side wall.

18. A portable electronic device comprising:
  a main body comprising a bottom wall and a side wall extending from one edge of the bottom wall, a receptacle being defined in the side wall thereof; and
  a subsidiary casing configured for receiving a battery therein, the subsidiary casing comprising a latch formed thereon, the latch engaged into the receptacle to prevent the subsidiary casing from moving in a plane parallel to the bottom wall, wherein the latch is inserted into the receptacle along a direction that is perpendicular to the bottom wall when the subsidiary casing is assembled to the main body, each latch includes an outboard part engaged in the receptacle, an inboard part located in the subsidiary casing, and a middle part connecting the outboard part with the inboard part.

19. The portable electronic device of claim 18, wherein the receptacle extends upwardly from a lower boarder of the side wall.

* * * * *

UNITED STATES PATENT AND TRADEMARK OFFICE
CERTIFICATE OF CORRECTION

| | | |
|---|---|---|
| PATENT NO. | : 7,894,793 B2 | Page 1 of 1 |
| APPLICATION NO. | : 11/306968 | |
| DATED | : February 22, 2011 | |
| INVENTOR(S) | : You-Zhi Li and Xi-Ping Dai | |

It is certified that error appears in the above-identified patent and that said Letters Patent is hereby corrected as shown below:

Title Page;
Please replace Section (73) regarding "Assignees" on the front page of the Patent with the following:

(73) Assignees: Hong Fu Jin Precision Industry (ShenZhen) Co., Ltd., Longhua Town, Bao'on District,Shenzhen,Guangdong Province (CN); Hon Hai Precision Industry Co. Ltd., Tu-Cheng, Taipei Hsien (TW).

Signed and Sealed this
Seventh Day of June, 2011

David J. Kappos
*Director of the United States Patent and Trademark Office*